(12) United States Patent
Denboer et al.

(10) Patent No.: US 9,961,633 B2
(45) Date of Patent: May 1, 2018

(54) BLUETOOTH LOW ENERGY COMBINED LISTEN AND SCAN WINDOW

(71) Applicant: QUALCOMM Incorporated, San Diego, CA (US)

(72) Inventors: Huibert Denboer, Escondido, CA (US); Brian Arnold Redding, Urbana, IL (US); Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/809,249

(22) Filed: Jul. 26, 2015

(65) Prior Publication Data
US 2017/0026905 A1    Jan. 26, 2017

(51) Int. Cl.
| | | |
|---|---|---|
| H04W 52/02 | (2009.01) | |
| H04W 4/20 | (2018.01) | |
| H04W 4/00 | (2018.01) | |
| H04W 76/02 | (2009.01) | |

(52) U.S. Cl.
CPC ....... *H04W 52/0216* (2013.01); *H04W 4/005* (2013.01); *H04W 4/008* (2013.01); *H04W 4/206* (2013.01); *H04W 76/02* (2013.01); *Y02B 60/50* (2013.01)

(58) Field of Classification Search
CPC ..... H04W 4/005; H04W 4/008; H04W 4/206; H04W 52/0216; H04W 76/02
See application file for complete search history.

(56) References Cited

U.S. PATENT DOCUMENTS

| | | |
|---|---|---|
| 2009/0248913 A1 | 10/2009 | Salokannel |
| 2014/0057564 A1 | 2/2014 | Palin et al. |
| 2014/0254466 A1 | 9/2014 | Wurster et al. |
| 2014/0355517 A1* | 12/2014 | Reunamaki ........... H04W 8/005 370/328 |

(Continued)

FOREIGN PATENT DOCUMENTS

WO    2015099751 A1    7/2015

OTHER PUBLICATIONS

EdWalker, "Bluetooth Low Energy (CC2540) Various Questions," TI E2E™ Community, May 2011, pp. 2.

(Continued)

*Primary Examiner* — Awet Haile
(74) *Attorney, Agent, or Firm* — Muncy, Geissler, Olds & Lowe, P.C./QUALCOMM

(57) ABSTRACT

Methods and apparatuses for establishing a wireless connection are disclosed. In an embodiment, a first communication device transmits a first advertising signal for a first period of time, the first advertising signal configured to advertise that the first communication device is available to establish a first wireless connection, scans for a second advertising signal for a second period of time, the second advertising signal transmitted by a second communication device and configured to advertise that the second communication device is available to establish a second wireless connection, and listens for a third signal for a third period of time, the third signal transmitted by a third communication device in response to the first advertising signal, the third period of time occurring during the second period of time.

30 Claims, 5 Drawing Sheets

(56) References Cited

U.S. PATENT DOCUMENTS

2017/0026791 A1\* 1/2017 Weizman .............. H04W 64/00

OTHER PUBLICATIONS

HD-BLE, "BLE Scanner on Just One Channel," TI E2E™ Community, Sep 2011, pp. 2.
New Member from TI E2E™ Community: "Combining 2 states," Sep. 2014, p. 1.
Bluetooth Sig: "Bluetooth Specification v4.2", Oct. 2, 2014 (Oct. 2, 2014), pp. 1-2772, XP055281707, Retrieved from the Internet: URL:https://www.bluetooth.org/DocMan/handlers/DownloadDoc.ashx?doc_id=286439 [retrieved on Jun. 20, 2016] Link Layer Specification—Chapter 4.4 (Non-Connected States).
International Search Report and Written Opinion—PCT/US2016/034384—ISA/EPO—dated Aug. 2, 2016.

\* cited by examiner

BLUETOOTH LOW ENERGY COMBINED LISTEN AND SCAN WINDOW

BACKGROUND

1. Field of the Disclosure

Embodiments of the disclosure relate to methods and apparatuses for establishing a wireless connection by combining listen and scan windows.

2. Description of the Related Art

Bluetooth® Low Energy (BLE), marketed as Bluetooth® Smart, is a wireless technology for establishing packet-based wireless networks among wireless devices operating in the 2.4 GHz to 2.4835 GHz frequency range with significantly reduced power consumption compared to legacy Bluetooth® devices, sometimes referred to as Classic Bluetooth® devices. Bluetooth® is a registered trademark of the Bluetooth® Special Interest Group (SIG), incorporated in Delaware, with global headquarters in Kirkland, Wash. (See www.bluetooth.org.) The Bluetooth® SIG maintains the specifications for Bluetooth® Smart, presently the Bluetooth® Specification 4.0 and the Bluetooth® Specification 4.1, where version 4.1 provides an update to version 4.0.

Low power wireless devices compliant with the Bluetooth® Smart specification are expected to find applications in healthcare, fitness, security, home appliances, and home entertainment, to name a few examples. Such devices are marketed as Bluetooth® Smart devices, and are expected to run for long periods of time, perhaps years, on a button or coin battery. Bluetooth® Smart Ready devices are wireless devices with dual protocol stacks capable of communicating with legacy Classic Bluetooth® devices as well as Bluetooth® Smart devices. For example, a cellphone may have Bluetooth® Smart Ready capability so that it may communicate with a legacy Classic Bluetooth® headset as well as a personal device having Bluetooth® Smart capability.

A Bluetooth® Smart device may be configured as a central (master) or peripheral (slave). Often the central is a smartphone, tablet, or personal computer. A master may set up a wireless network with multiple peripherals, where connections are established between the master and each peripheral. A Bluetooth® Smart device may also be configured as a server or a client. In practice, the server may be thought of as having data of interest, where a client connects with the server to request the data and perhaps modify the state of the server. Usually, the central is the client and a peripheral is the server.

For example, a Bluetooth® Smart home thermostat may store temperature values over some period of time, and perform as a server and peripheral to a smartphone when the smartphone is brought in proximity to the home thermostat. The home thermostat may advertise itself so that when the smartphone is in range a connection is established with the smartphone as the central and the home thermostat as the peripheral. In this example, the smartphone performs as the client, requesting the stored temperature values from the home thermostat. Based upon an application running on the smartphone, the smartphone may change the state of the thermostat whereby the home thermostat's temperature setting is raised or lowered depending upon the stored temperature readings and other information that the smartphone may access from the home thermostat or perhaps from cloud-based databases.

Bluetooth® Smart technology will find applications in many devices in common use around a home, office, or factory. For example, FIG. 1 illustrates a wireless network in which the smartphone 102 may be a master and client to multiple Bluetooth® Smart capable devices: the wristwatch 104 with a sensor to measure pulse rate; the home thermostat 106; the key fob 108 with stored car seat settings and other car preferences; the athletic shoe 110 with a pedometer; the wrist band 112 with a sensor to measure blood pressure and heart rate; the personal thermometer 114; the weight scale 116; the laptop 118; and the television 120. The smartphone 102 may be connected to the Internet 122 so that various databases may be accessed to store readings or to adjust the state of some of the Bluetooth® Smart devices, or perhaps to alert a health care professional or emergency service personnel if a reading from a Bluetooth® Smart device indicates a health issue or urgent situation.

SUMMARY

The following presents a simplified summary relating to one or more aspects and/or embodiments associated with the mechanisms disclosed herein to establish a wireless connection by combining listen and scan windows. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of establishing a wireless connection includes transmitting, by a first communication device, a first advertising signal for a first period of time, the first advertising signal configured to advertise that the first communication device is available to establish a first wireless connection, scanning, by the first communication device, for a second advertising signal for a second period of time, the second advertising signal transmitted by a second communication device and configured to advertise that the second communication device is available to establish a second wireless connection, and listening, by the first communication device, for a third signal for a third period of time, the third signal transmitted by a third communication device in response to the first advertising signal, the third period of time occurring during the second period of time.

An apparatus for establishing a wireless connection includes at least one processor, and a memory coupled to the at least one processor and storing instructions that, when executed by the at least one processor, cause a first communication device to: transmit a first advertising signal for a first period of time, the first advertising signal configured to advertise that the first communication device is available to establish a first wireless connection, scan for a second advertising signal for a second period of time, the second advertising signal transmitted by a second communication device and configured to advertise that the second communication device is available to establish a second wireless connection, and listen for a third signal for a third period of time, the third signal transmitted by a third communication device in response to the first advertising signal, the third period of time occurring during the second period of time.

An apparatus for establishing a wireless connection includes means for transmitting, by a first communication device, a first advertising signal for a first period of time, the first advertising signal configured to advertise that the first communication device is available to establish a first wireless connection, means for scanning, by the first communication device, for a second advertising signal for a second period of time, the second advertising signal transmitted by a second communication device and configured to advertise that the second communication device is available to establish a second wireless connection, and means for listening, by the first communication device, for a third signal for a third period of time, the third signal transmitted by a third communication device in response to the first advertising signal, the third period of time occurring during the second period of time.

A non-transitory computer-readable medium for establishing a wireless connection includes at least one instruction to cause a first communication device to transmit a first advertising signal for a first period of time, the first advertising signal configured to advertise that the first communication device is available to establish a first wireless connection, at least one instruction to cause the first communication device to scan for a second advertising signal for a second period of time, the second advertising signal transmitted by a second communication device and configured to advertise that the second communication device is available to establish a second wireless connection, and at least one instruction to cause the first communication device to listen for a third signal for a third period of time, the third signal transmitted by a third communication device in response to the first advertising signal, the third period of time occurring during the second period of time.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
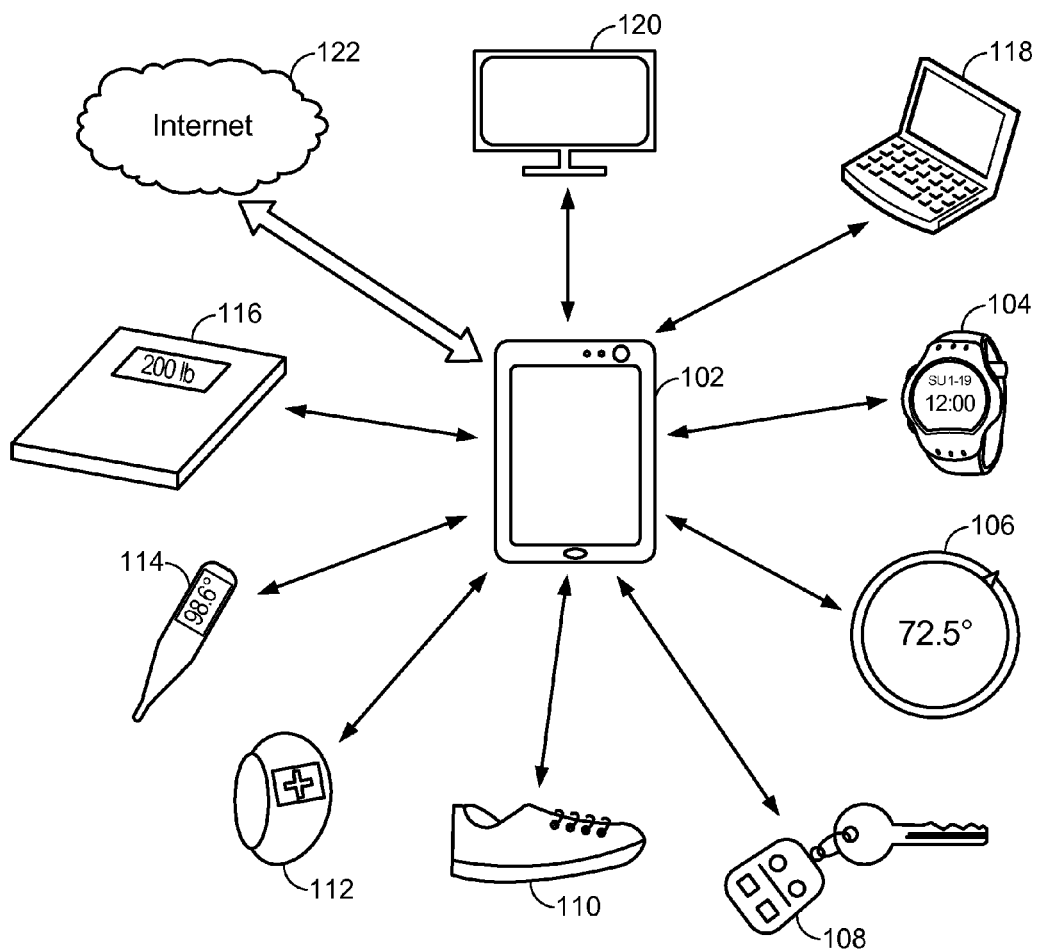
FIG. 1 illustrates various consumer devices in which embodiments of the disclosure may be incorporated.

The present application for patent is related to the following co-pending U.S. patent application: "BLUETOOTH LOW ENERGY INTERLACED ADVERTISING AND SCANNING," having 12/863,023, filed concurrently herewith, assigned to the assignee hereof, and expressly incorporated herein by reference in its entirety.

Methods and apparatuses for establishing a wireless connection are disclosed. In an embodiment, a first communication device transmits a first advertising signal for a first period of time, the first advertising signal configured to advertise that the first communication device is available to establish a first wireless connection, scans for a second advertising signal for a second period of time, the second advertising signal transmitted by a second communication device and configured to advertise that the second communication device is available to establish a second wireless connection, and listens for a third signal for a third period of time, the third signal transmitted by a third communication device in response to the first advertising signal, the third period of time occurring during the second period of time.

These and other aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action. However, the term "logic configured to" does not refer to software alone, but relies at least in part upon hardware to achieve its functionality.

A Bluetooth® Smart device operates among 40 channels in the 2.4 GHz to 2.4835 GHz frequency range, with a channel spacing of 2 MHz. The data rate is 1 Mbps, with Gaussian frequency shift keying (GFSK) modulation for each symbol. The frequency of a channel may be expressed by $f(k)=2402+2k$ (MHz), where k is an RF (Radio Frequency) channel index with values in the range 0, 1, . . . , 39.

The RF channel index is mapped into advertising channels and data channels, where the RF channel index values 0, 12, and 39 are mapped into three advertising channel index values 37, 38, and 39, respectively. The remaining RF channel index values are mapped into 37 data channel index values 0, 1, . . . , 36.

To reduce interference among multiple Bluetooth® Smart devices, each Bluetooth® Smart device may employ carrier frequency hopping once a data connection is established. For example, adaptive frequency hopping may be employed during data connection, where the data channel index k(n+1) at the $(n+1)^{th}$ hop in terms of the data channel index k(n) at the $n^{th}$ hop is given by k(n+1)=(k(n)+Hop_Inc) mod 37, where the integer Hop_Inc is a hop increment.

As used herein, the term "communication device" is used to connote any one of a number of communication devices that may include Bluetooth® Smart capability. A communication device may be, for example, a smartphone, tablet, or laptop, or any one of the devices discussed with respect to FIG. 1, to name a few examples. A communication device may therefore, in addition to being Bluetooth® Smart capable, be able to communicate in various wireless networks, such as for example a Wi-Fi® network (Wi-Fi is a registered trademark of the Wi-Fi Alliance) or a cellular network (e.g., GSM, UMTS, LTE), to name a few examples. A communication device may be able to communicate with other communication devices, or access servers, via the Internet by way of a wireless network (e.g., a Wi-Fi network or cellular network).

A communication device uses advertising events before a data connection is established. During advertising events, a communication device may be in an advertising state or a scanning state. A communication device in an advertising state is referred to as an advertiser, and a communication device in a scanning state is referred to as a scanner. When a connection is established after one or more advertising events, communication devices use connection events for sending data packets between a central and a peripheral.

An advertiser sends advertising packets in an advertising event. An advertiser begins an advertising event by transmitting an advertising packet on one of the advertising channels. The time duration of an advertising packet varies by payload, and for an embodiment may be in the range of 128 μs to 366 μs. After a wait time referred to as an Inter Frame Space (T_IFS), the advertiser listens for any scanners. For an embodiment, T_IFS may be 150 μs and the listening time may be 50 μs. If another communication device acting as a scanner detects the advertising packet, then depending upon the type of the advertising packet, the scanner may reply with a request packet, whereupon the advertiser replies back with a response packet.

An advertiser may advertise sequentially on some or all of the three advertising channels, and a scanner may listen (scan) sequentially on some or all of the three advertising channels. In conventional Bluetooth® Smart technology, a communication device normally performs as an advertiser for a sequence of three advertising packets before performing as a scanner for a sequence of three scanning intervals. This is illustrated in FIG. 2.

Figure 2:
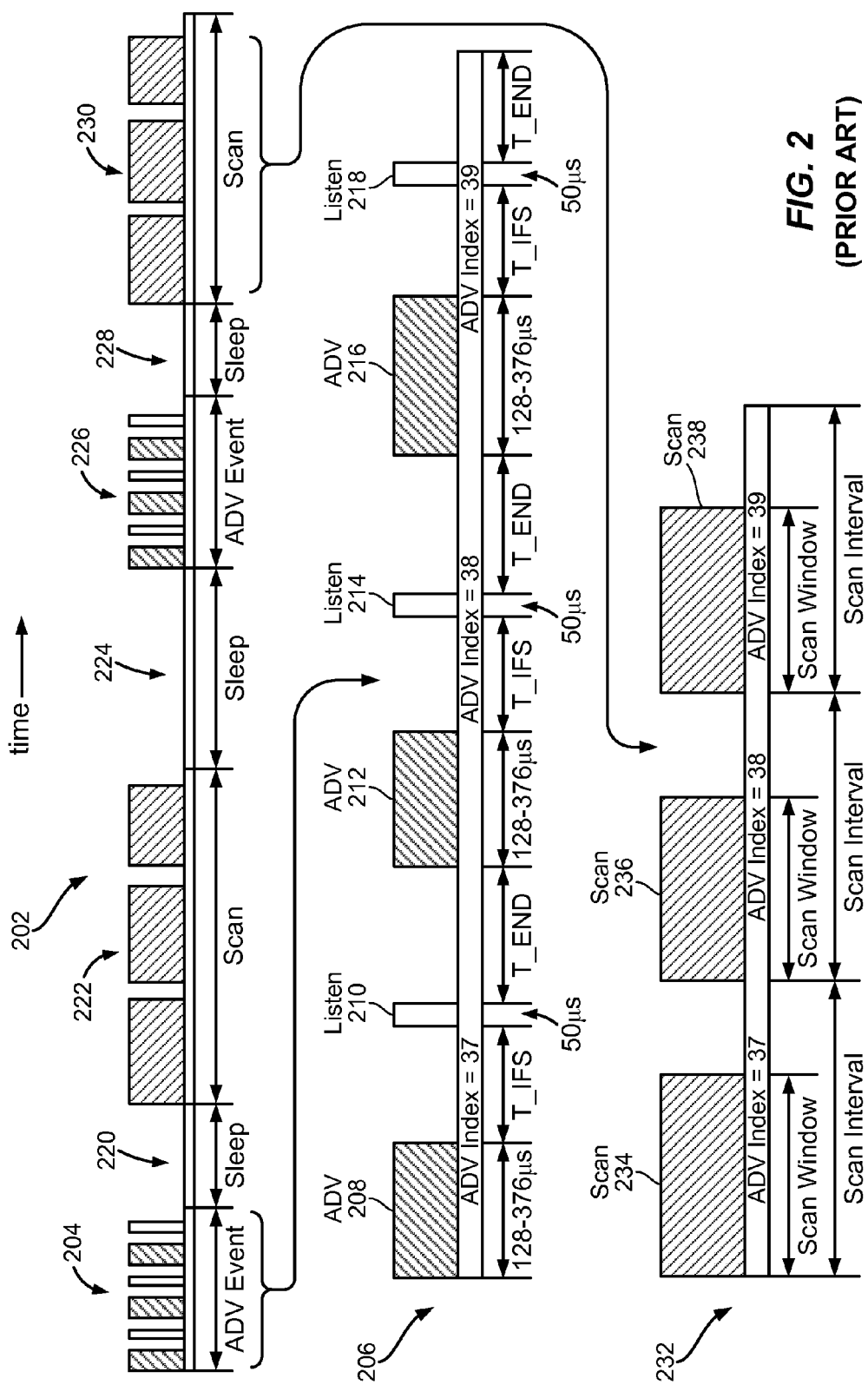
FIG. 2 illustrates the activity of a communication device when acting at various times as an advertiser and at other times as a scanner.

FIG. 2 illustrates the activity of a communication device when acting at various times as an advertiser and at other times as a scanner. The time line 202 begins with an advertising event 204. The advertising event 204 includes three advertising packets, shown in more detail in the time line pointed to by the arrow 206 (and referred to as the time line 206). As seen in the time line 206, the advertising event 204 may be viewed as having three sub-events, each sub-event comprising an advertising packet followed by a listening time slot. For example, the first sub-event comprises the advertising packet 208 and the listening time slot 210, with a time interval T_IFS in between. The RF channel index for this first sub-event is 0, which maps to the advertising channel index 37. After a time interval indicated by T_End, which may vary, a second sub-event event begins comprising the advertising packet 212 followed by the listening time slot 214. (The time interval T_END may vary because an embodiment may space the beginning of advertising packets 208 and 212 apart by up to 10 ms. A typical implementation may compress these advertising packets as close together as possible resulting in a very short T_END duration.)

The RF channel index is 12 for the second sub-event comprising the advertising packet 212 and the listening time slot 214, where the RF channel index 12 maps to the advertising channel index 38. Again, after a time interval indicated by T_End, a third sub-event begins with the advertising packet 216 followed by the listening time slot 218. The RF channel index for this third sub-event is 39, which maps to the advertising channel index 39. In the example of FIG. 2, during the advertising event 204 (the time line 206), it is assumed that another communication device, acting as a scanner, is not available (or not detected).

At the end of the third sub-event in the advertising event 204, the communication device enters into a sleep mode as indicated by the sleep interval 220. After the sleep interval 220, the communication device becomes a scanner and a scanning event, labeled 222, begins. In the time line 202, the sleep interval 224 follows the scanning event 222, and the communication device once again becomes an advertiser as indicated by the advertising event 226. For ease of illustration, it is assumed that another communication device acting as a scanner is not available (or not detected) during the advertising event 226, so that after the advertising event 226 has completed the communication device again enters a sleep mode as indicated by the sleep interval 228. After the sleep interval 228, the communication device again becomes a scanner and begins the scanning event 230.

For illustrative purposes the scanning event 230 is shown in more detail by the time line pointed to by the arrow 232 (and referred to as the time line 232). The scanning event in the time line 232 comprises the three scanning windows 234, 236, and 238. In an embodiment, a scanning window is in the range of 775 μs to 3.42 seconds. During these three scanning windows, the scanner listens for an advertising packet. For ease of illustration, it is assumed that another communication device acting as an advertiser is not available (or not detected) during the two scanning events 222 and 230, so that the time line 232 shows three scanning windows without any activity from an advertiser. The RF channel index values during the scanning windows 234, 236, and 238, are respectively 0, 12, and 39. Each scanning window occurs within a scanning interval.

From the time lines illustrated in FIG. 2, it is seen that a communication device enters and exits advertising states, scanning states, and sleep states. For example, during an advertising event, the communication device performs a sequence of transmitting an advertising packet, waiting during the Inter Frame Space, listening during the listening time slot, and waiting again during the time interval indicated as T_END in the time line 206. Such activity results in power consumption because the communication device is often re-tuning its frequency synthesizer, waiting and idling before listening for responses to its advertisements, and switching in and out of the sleep mode.

Accordingly, the methods and apparatuses described herein allow for interlacing the advertising and scanning states on the same channel index by first transmitting an advertisement followed by a combined listen/scan receive window. In this way, no waiting/idling periods are needed. Interlacing the advertising and scanning states is discussed in greater detail in the co-pending patent application entitled "BLUETOOTH LOW ENERGY INTERLACED ADVERTISING AND SCANNING."

To combine the listen/scan states, immediately after transmitting an Advertisement, the Bluetooth® processor, in conjunction with the Bluetooth® antenna (e.g., Bluetooth® processor 524 and antenna 530 in FIG. 5), can open a combined listen/scan window on the same channel index on which it just transmitted the Advertisement. The "listen" portion of the combined window will start approximately T_IFS after the Advertisement transmission ends. The communication device will only respond to Scan/Connection Requests received during this "listen" period. If a Scan/Connection Request is received outside of the "listen" period, plus or minus some amount, it will be ignored and the Bluetooth® antenna will remain on. During the entire combined listen/scan window, including the "listen" period, the communication device will properly respond when any Advertisement packet is received. Such a combined listen/scan receive window is more power efficient since less time is spent in waiting/idling periods, re-tuning the synthesizer, and switching states.

Figure 3:
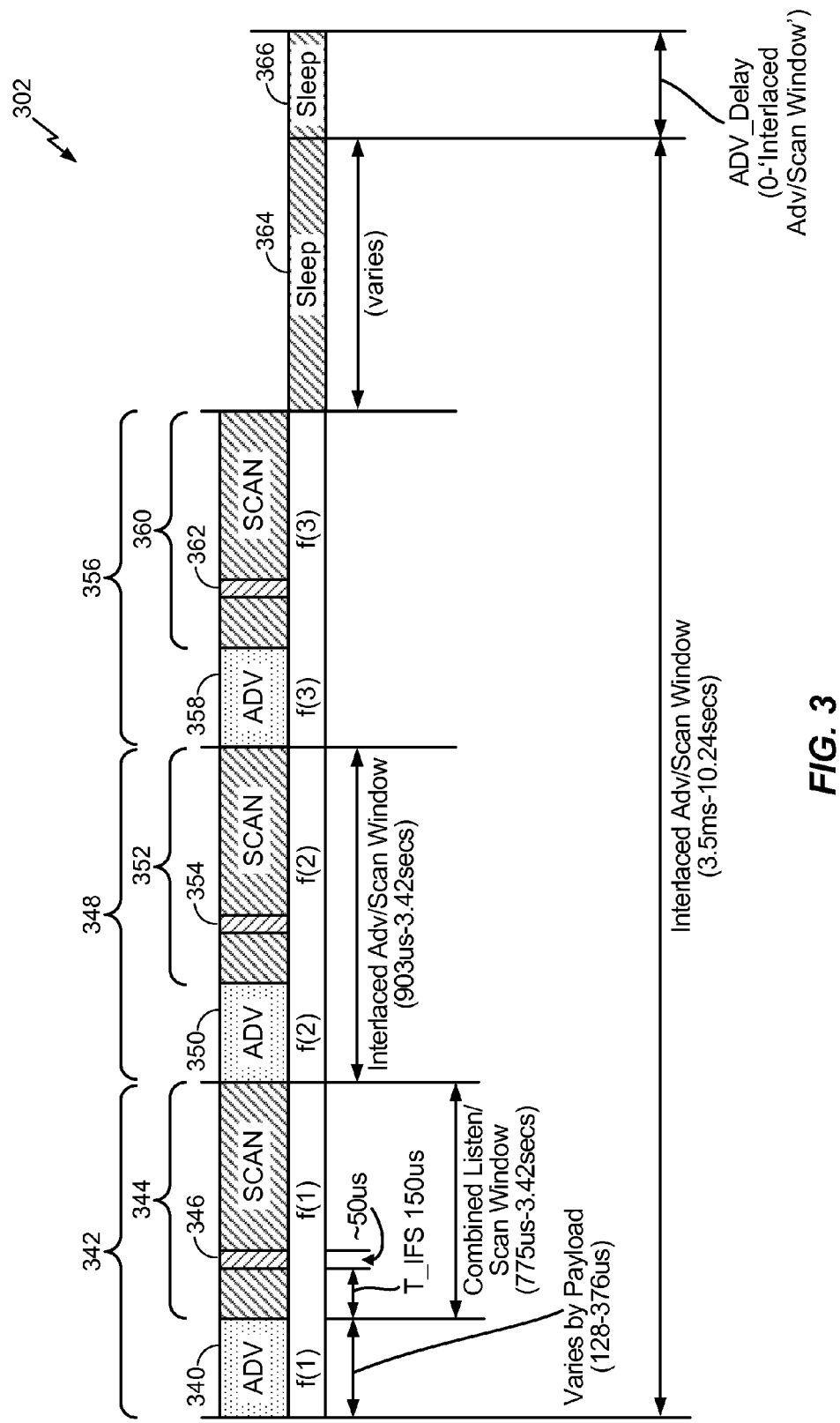
FIG. 3 illustrates activity of a communication device according to at least one aspect of the disclosure.

FIG. 3 illustrates activity of a communication device according to an embodiment of the disclosure. In FIG. 3, the beginning of an advertising packet 340 marks the beginning of an interlaced advertising and scanning sub-event on the same channel index, here f(1), labeled 342. After transmitting the advertising packet 340, the Bluetooth® processor on the communication device immediately switches the Bluetooth® antenna to scanning on the same channel index on which the advertising packet 340 was transmitted (i.e., f(1)) without entering an intervening sleep interval, illustrated as scanning window 344. T_IFS after the end of the advertising packet 340, the Bluetooth® antenna listens for a response to the advertisement packet 340, illustrated as listening time slot 346. As illustrated in FIG. 3, the listening time slot 346 occurs while the Bluetooth® antenna of the communication device is also scanning in the scanning window 344. As such, the scanning window 344 is a combined listen/scan window.

During the listening time slot 346, the communication device is listening for another communication device acting as a scanner, and at the same time, acting as a scanner and listening for another communication device acting as an advertiser.

In the example of FIG. 3, it is assumed that another communication device, whether acting as an advertiser or as a scanner, is not available (or is not detected). In such a case, the communication device, if programmed to transmit on a second advertising channel, begins another interlaced advertising and scanning sub-event with a combined listen/scan window, labeled 348, on the advertising channel index f(2). Specifically, the communication device, acting as an advertiser, begins transmitting the advertising packet 350, after which the communication device also acts as a scanner and immediately begins the scanning window 352 on the same channel index (i.e., f(2)) without an intervening sleep interval. The listening time slot 354 corresponding to the advertisement packet 350 occurs at the time T_IFS after the end of the advertising packet 350.

If, again, another communication device, whether acting as an advertiser or as a scanner, is not available (or is not detected), and if the communication device is programmed to transmit on a third advertising channel, the communication device begins another interlaced advertising and scanning sub-event with a combined listen/scan window, labeled 356, on the advertising channel index f(3). The communication device, acting as an advertiser, begins transmitting the advertising packet 358, after which the communication device also acts as a scanner and immediately begins the scanning window 360 on the same channel index (i.e., f(3)) without an intervening sleep interval. The communication device begins the listening time slot 362 corresponding to the advertising packet 358 at the time T_IFS after the end of the advertising packet 358.

Assuming no other communication device is detected, the communication device enters a sleep mode during the sleep interval 364. An additional time interval, denoted as ADV_delay and labeled as the sleep interval 366 in FIG. 3, may be added to the sleep interval 364. The value of ADV_delay may be obtained from a pseudo-random number generator, so that dithering is added to the timing of the combined advertising and scanning sub-event. After being in a sleep mode during the sleep intervals 364 and 366, the communication device according to an embodiment begins again the procedure illustrated in FIG. 3.

Although FIG. 3 illustrates the communication device performing an interlaced advertising and scanning sub-event with a combined listen/scan window on three channels (f(1), f(2), and f(3)) before entering a sleep mode, the communication device may perform any number of the disclosed interlaced advertising/scanning/listening sub-events before entering sleep mode.

Figure 4:
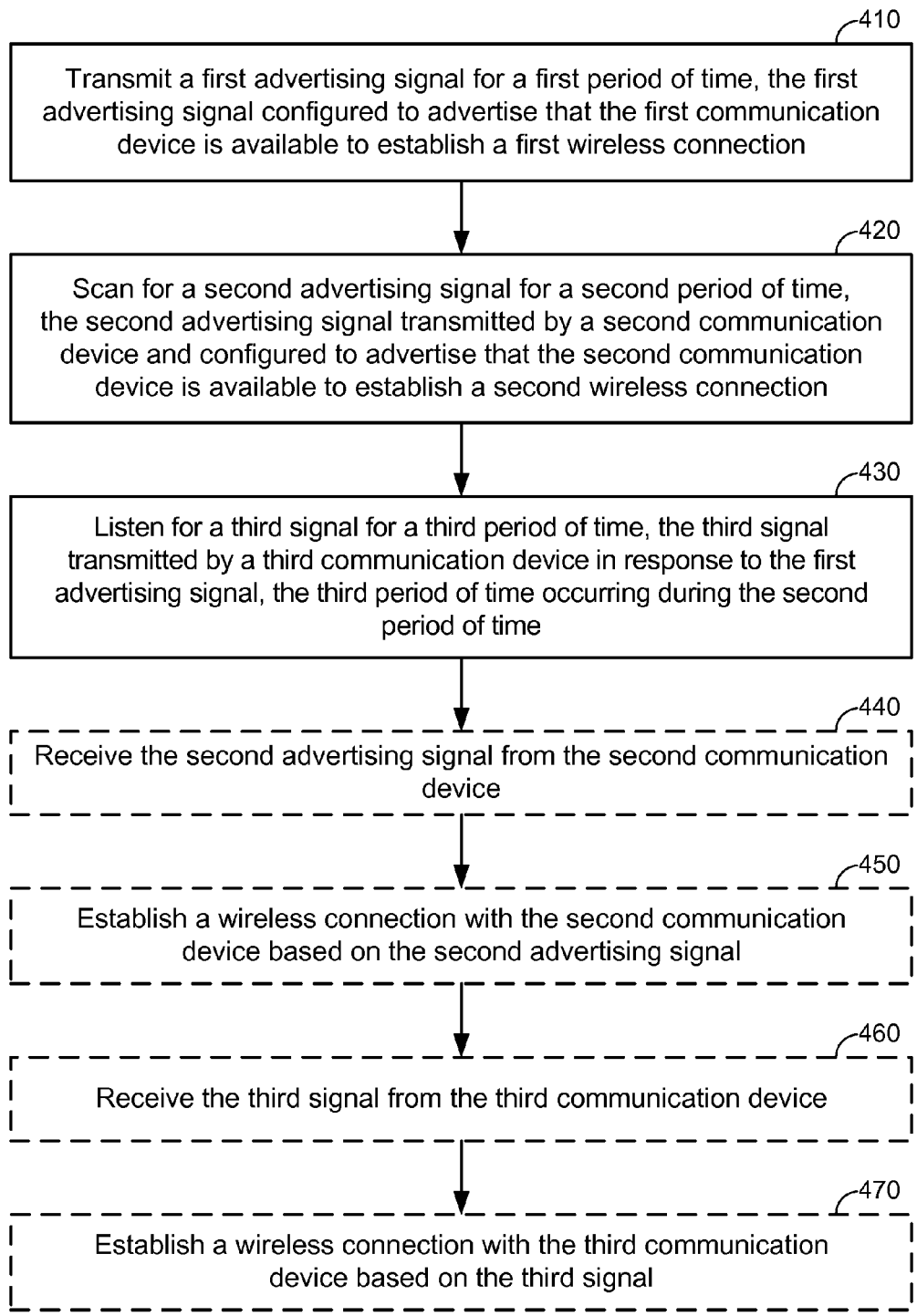
FIG. 4 illustrates an exemplary flow for establishing a wireless connection using a combined listen/scan window according to at least one aspect of the disclosure.

FIG. 4 illustrates an exemplary flow for establishing a wireless connection using a combined listen/scan window. The flow illustrated in FIG. 4 may be performed by a communication device, such as communication device 500 described below with reference to FIG. 5.

At 410, the communication device transmits a first advertising signal for a first period of time, such as the advertising packet 340 in FIG. 3. The first advertising signal may be configured to advertise that the communication device is available to establish a first wireless connection, such as a Bluetooth® Low Energy connection.

At 420, the communication device scans for a second advertising signal for a second period of time, such as the scanning window 344 in FIG. 3. The second advertising signal may be transmitted by a second communication device and may be configured to advertise that the second communication device is available to establish a second wireless connection, such as a Bluetooth® Low Energy connection. As illustrated in FIG. 3, the beginning of the second period of time is at an end of the first period of time. The second period of time is defined by at least one of the Bluetooth® Core Version 4.0 specification or the Bluetooth® Core Version 4.1 specification.

At 430, the communication device listens for a third signal for a third period of time, such as the listening time slot 346 in FIG. 3. The third signal may be transmitted by a third communication device in response to the first advertising signal, and the third period of time may occur during the second period of time, thereby providing a combined listen/scan window. The communication device may scan for the second advertising signal and listen for the third signal on the same channel (e.g., f(1)) as the channel upon which the first advertising signal was transmitted. The third signal may be a connection request or scan request signal. In addition, the third communication device may or may not be the same communication device as the second communication device. The beginning of the third period of time may be defined by at least one of the Bluetooth® Core Version 4.0 specification or the Bluetooth® Core Version 4.1 specification.

The communication device ignores connection requests and scan requests received outside of the third period of time. However, the communication device will respond to advertising signals received during the entire duration of the second period of time. Additionally, the communication device begins scanning for the second advertising signal after transmitting the first advertising signal and without entering an interleaving sleep interval.

At 440, the communication device optionally receives the second advertising signal from the second communication device. At 450, the communication device optionally establishes a wireless connection with the second communication device based on the second advertising signal.

Alternatively, or additionally, at 460, the communication device may optionally receive the third signal from the third communication device. At 470, the communication device optionally establishes a wireless connection with the third communication device based on the third signal.

Although not illustrated in FIG. 4, the flow may further include transmitting a third advertising signal for a third period of time, such as advertising packet 350 in FIG. 3. The third advertising signal may be configured to advertise that the communication device is available to establish a third wireless connection, such as a Bluetooth® Low Energy connection. The communication device may scan for a fourth advertising signal for a fourth period of time, such as the scanning window 352 in FIG. 3. The fourth advertising signal may be transmitted by a fourth communication device and configured to advertise that the fourth communication device is available to establish a fourth wireless connection, such as a Bluetooth® Low Energy connection. The communication device may listen for a fifth signal for a fifth period of time, such as the listening time slot 354 in FIG. 3. The fifth signal may be transmitted by a fifth communication device in response to the third advertising signal, and the fifth period of time may occur during the fourth period of time. In this case, the communication device may transmit the first advertising signal, scan for the second advertising signal, and listen for the third signal on a first channel (e.g., f(1)), while transmitting the third advertising signal, scanning for the fourth advertising signal, and listening for the fifth signal on a second channel different from the first channel (e.g., f(2)).

Figure 5:
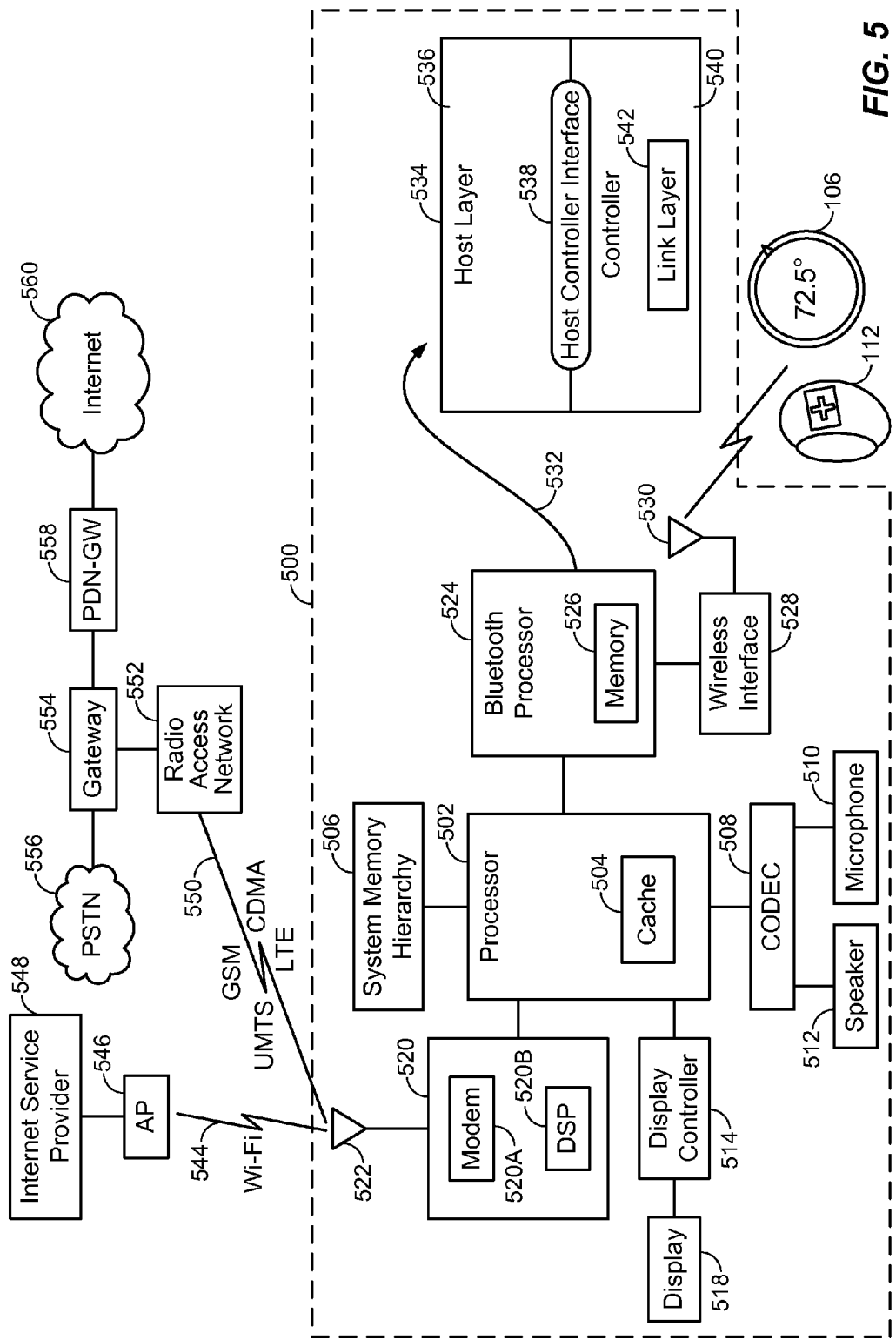
FIG. 5 illustrates a simplified diagram of an exemplary architecture of a device according to at least one embodiment of the disclosure.

FIG. 5 illustrates a communication device 500 in which embodiments of the disclosure may find application. The communication device 500 may be any one of a number of communication devices, such as a smartphone, tablet, or laptop, to name a few examples. The main processor 502 for the communication device 500 runs applications visible to the user of the communication device 500, and includes the cache memory 504 as well as an interface to store and retrieve data and instructions from off-chip memory, represented in FIG. 5 as the system memory hierarchy 506. The system memory hierarchy 506 may comprise various volatile and non-volatile memory systems. Also shown in FIG. 5 is the CODEC (Coder-Decoder) 508 for interfacing with the microphone 510 and the speaker 512. The display controller 514 provides an interface to the display 518 so that the user may easily interact with the communication device 500.

The communication device 500 is capable of interfacing with other wireless networks by way of the communication functional unit 520 and the antenna 522. The communication functional unit is illustrated as comprising the modem 520A and the digital signal processor (DSP) 520B, although in practice other kinds of modules may be employed, all or some such modules may be integrated on a single chip, and some of the modules may be integrated with the processor 502.

The main processor 502 may implement a Bluetooth® Smart or Bluetooth® Smart Ready protocol stack in which instructions for performing some or all of the protocol stack are stored in the system memory hierarchy 506. However, in the example of FIG. 5, a separate chip or an embedded hardware core, shown as the Bluetooth® processor 524, implements the portions of the protocol stack to perform the steps indicated in FIG. 4. The Bluetooth® processor 524 comprises the memory 526, shown as an on-chip memory, although the memory 526 may be part of a memory hierarchy in which some memory also resides off-chip. The wireless interface 528 provides an interface to the antenna 530, suitable for operating in the designated frequency spectrum utilized by Bluetooth®. Communication may be made any number of Bluetooth® Smart capable devices, such as for example the home thermostat 106 or the wristband 112, to name just two examples.

The arrow 532 serves to indicate that the Bluetooth® processor 524 performs the protocol stack, represented by the box labeled 534. Shown in the protocol stack 534 are the host layer 536, the host controller interface 538, and the controller 540. The controller 540 includes the link layer 542. For ease of illustration, not all layers are shown. Software or firmware running on the Bluetooth® processor 524 may implement all or some of the layers in the protocol stack 534, and special purpose hardware, such as an ASIC, may also implement some of the layers.

It is to be appreciated that the Bluetooth® processor 524 may represent more than one processor, where for example a programmable processor may implement the host layer 536 and a DSP may implement some or all of the actions performed by controller 540, except perhaps for the physical layer (not shown). The instructions for implementing some or all of the actions indicated in FIG. 4 may be stored in a memory, such as for example the memory 526. The memory 526 may be referred to as a non-transitory computer readable medium.

The link layer 542 may implement many of the steps illustrated in FIG. 4, and the host layer 536 may implement the procedures for handling a response to a received advertisement, the procedures for handling a response to a connection request or a scan request, or the procedures for establishing a Bluetooth® connection with another communication device, such as at 450 and 470 in FIG. 4. An embodiment may include a command (not found in the Bluetooth® Low Energy specification) by which the host layer 536 instructs the link layer 542 to interlace the advertising and scanning states on the same channel index, such as at 410-430 of FIG. 4. Such commands are in contrast to the standard commands in the Bluetooth® Low Energy specification that allow the host layer 536 to instruct the link layer 542 to go into an advertising state or a scan state, but not to perform both advertising and scanning in an interlaced fashion as described herein. The controller 540, such as the physical layer, includes the capability to transition from transmit to receive on the same channel without re-turning a frequency synthesizer.

The communication device 500 can participate in one or more wireless networks to gain access to the Internet. In the example of FIG. 5, the communication device 500 has a Wi-Fi link 544 to the access point (AP) 546, where the Internet service provider (ISP) 548 provides access to the Internet.

The communication device 500 may also have the functionality of a cellular phone so as to participate in any one of a number of cellular networks. For example, the communication device 500 has an air interface link 550 which may for example be compatible network systems according to CDMA (Code Division Multiple Access), GSM (Global System for Mobile Communications), UMTS (Universal Mobile Telecommunications Systems), and LTE (Long-Term Evolution). The air interface link 550 provides communication to a radio access network 552, where the architecture of the radio access network 552 depends upon the type of network standard. For example, in the case of a GSM network, the radio access network 552 includes a base station, where for UMTS it includes a Node-B, and where for LTE it includes eNode-B, as specified by 3GPP (3rd Generation Partnership Project).

Not all functional units are illustrated in FIG. 5 for providing a connection to the Internet, but for ease of illustration several components are shown, such as the Gateway 554 that generically represents several network components for providing communication to the public switched telephone network (PSTN) 556 and the packet data network gateway (PDN-GW) 558, where the PDN-GW 558 provides the proper communication interface to the Internet 560. Clearly, the network architecture illustrated in FIG. 5 for the Wi-Fi link 544 and the air interface link 550 is simplified for ease of illustration.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of establishing a wireless connection, comprising:
    transmitting, by a first communication device, a first advertising signal for a first period of time, the first advertising signal configured to advertise that the first communication device is available to establish a first wireless connection;
    after transmitting the first advertising signal for the first period of time, switching, by the first communication device, to a scanning state having a duration of a second period of time following the first period of time, wherein, during the scanning state, the first communication device scans for a second advertising signal transmitted by a second communication device and configured to advertise that the second communication device is available to establish a second wireless connection; and
    while the first communication device is in the scanning state, listening, by the first communication device, for a third signal for a third period of time, the third signal transmitted by a third communication device in response to the first advertising signal, the third period of time occurring during the second period of time a predefined wait time after the first period of time.

2. The method of claim 1, wherein a beginning of the second period of time is at an end of the first period of time.

3. The method of claim 1, wherein the first communication device scans for the second advertising signal and listens for the third signal on a same channel as the first advertising signal was transmitted.

4. The method of claim 1, wherein the third signal comprises a connection request or scan request signal.

5. The method of claim 4, wherein the first communication device ignores connection requests or scan requests received outside of the third period of time.

6. The method of claim 1, wherein the first communication device responds to advertising signals received during an entire duration of the second period of time.

7. The method of claim 1, wherein the first communication device begins scanning for the second advertising signal after transmitting the first advertising signal and without entering an interleaving sleep interval.

8. The method of claim 1, further comprising:
    transmitting, by the first communication device, a third advertising signal for a third period of time, the third advertising signal configured to advertise that the first communication device is available to establish a third wireless connection;
    scanning, by the first communication device, for a fourth advertising signal for a fourth period of time, the fourth advertising signal transmitted by a fourth communication device and configured to advertise that the fourth communication device is available to establish a fourth wireless connection; and
    listening, by the first communication device, for a fifth signal for a fifth period of time, the fifth signal transmitted by a fifth communication device in response to the third advertising signal, the fifth period of time occurring during the fourth period of time.

9. The method of claim 8, wherein the first communication device transmits the first advertising signal, scans for the second advertising signal, and listens for the third signal on a first channel, and
    wherein the first communication device transmits the third advertising signal, scans for the fourth advertising signal, and listens for the fifth signal on a second channel different from the first channel.

10. The method of claim 1, wherein the first communication device comprises a Bluetooth® Low Energy-capable device, and wherein the first wireless connection comprises a Bluetooth® Low Energy connection.

11. The method of claim 1, wherein the second period of time is defined by at least one of a Bluetooth® Core Version 4.0 specification or a Bluetooth® Core Version 4.1 specification.

12. The method of claim 1, wherein a beginning of the third period of time is defined by at least one of a Bluetooth® Core Version 4.0 specification or a Bluetooth® Core Version 4.1 specification.

13. The method of claim 1, further comprising:
    receiving the second advertising signal from the second communication device; and
    establishing a wireless connection with the second communication device based on the second advertising signal.

14. The method of claim 1, further comprising:
    receiving the third signal from the third communication device; and
    establishing a wireless connection with the third communication device based on the third signal.

15. An apparatus for establishing a wireless connection, comprising:
    at least one processor; and
    a memory coupled to the at least one processor and storing instructions that, when executed by the at least one processor, cause a first communication device to:
        transmit a first advertising signal for a first period of time, the first advertising signal configured to advertise that the first communication device is available to establish a first wireless connection;
        after transmission of the first advertising signal for the first period of time, switch to a scanning state having a duration of a second period of time following the first period of time, wherein, during the scanning state, the first communication device scans for a second advertising signal transmitted by a second communication device and configured to advertise that the second communication device is available to establish a second wireless connection; and
        while the first communication device is in the scanning state, listen for a third signal for a third period of time, the third signal transmitted by a third communication device in response to the first advertising signal, the third period of time occurring during the second period of time a predefined wait time after the first period of time.

16. The apparatus of claim 15, wherein a beginning of the second period of time is at an end of the first period of time.

17. The apparatus of claim 15, wherein the instructions, when executed by the at least one processor, further cause the first communication device to scan for the second advertising signal and listen for the third signal on a same channel as the first advertising signal was transmitted.

18. The apparatus of claim 15, wherein the third signal comprises a connection request or scan request signal.

19. The apparatus of claim 18, wherein the instructions, when executed by the at least one processor, further cause the first communication device to ignore connection requests or scan requests received outside of the third period of time.

20. The apparatus of claim 15, wherein the instructions, when executed by the at least one processor, further cause the first communication device to respond to advertising signals received during an entire duration of the second period of time.

21. The apparatus of claim 15, wherein the instructions, when executed by the at least one processor, further cause the first communication device to begin scanning for the second advertising signal after transmission of the first advertising signal and without entering an interleaving sleep interval.

22. The apparatus of claim 15, wherein the instructions, when executed by the at least one processor, further cause the first communication device to:
    transmit a third advertising signal for a third period of time, the third advertising signal configured to advertise that the first communication device is available to establish a third wireless connection;
    scan for a fourth advertising signal for a fourth period of time, the fourth advertising signal transmitted by a fourth communication device and configured to advertise that the fourth communication device is available to establish a fourth wireless connection; and
    listen for a fifth signal for a fifth period of time, the fifth signal transmitted by a fifth communication device in response to the third advertising signal, the fifth period of time occurring during the fourth period of time.

23. The apparatus of claim 22, wherein the instructions, when executed by the at least one processor, further cause the first communication device to transmit the first advertising signal, scans for the second advertising signal, and listens for the third signal on a first channel, and
    wherein the instructions, when executed by the at least one processor, further cause the first communication device to transmit the third advertising signal, scan for the fourth advertising signal, and listen for the fifth signal on a second channel different from the first channel.

24. The apparatus of claim 15, wherein the first communication device comprises a Bluetooth® Low Energy-capable device, and wherein the first wireless connection comprises a Bluetooth® Low Energy connection.

25. The apparatus of claim 15, wherein the second period of time is defined by at least one of a Bluetooth® Core Version 4.0 specification or a Bluetooth® Core Version 4.1 specification.

26. The apparatus of claim 15, wherein a beginning of the third period of time is defined by at least one of a Bluetooth® Core Version 4.0 specification or a Bluetooth® Core Version 4.1 specification.

27. The apparatus of claim 15, wherein the instructions, when executed by the at least one processor, further cause the first communication device to:
    receive the second advertising signal from the second communication device; and
    establish a wireless connection with the second communication device based on the second advertising signal.

28. The apparatus of claim 15, wherein the instructions, when executed by the at least one processor, further cause the first communication device to:
    receive the third signal from the third communication device; and
    establish a wireless connection with the third communication device based on the third signal.

29. A first communication device for establishing a wireless connection, comprising:
    means for transmitting a first advertising signal for a first period of time, the first advertising signal configured to advertise that the first communication device is available to establish a first wireless connection;
    means for switching, after transmission of the first advertising signal for the first period of time, to a scanning state having a duration of a second period of time following the first period of time, wherein, during the scanning state, the first communication device scans for a second advertising signal transmitted by a second communication device and configured to advertise that the second communication device is available to establish a second wireless connection; and
    means for listening, while the first communication device is in the scanning state, for a third signal for a third period of time, the third signal transmitted by a third communication device in response to the first advertising signal, the third period of time occurring during the second period of time a predefined wait time after the first period of time;
    after transmitting the first advertising signal for the first period of time, switching, by the first communication device, to a scanning state having a duration of a second period of time following the first period of time, wherein, during the scanning state, the first communication device scans for a second advertising signal transmitted by a second communication device and configured to advertise that the second communication device is available to establish a second wireless connection; and
    while the first communication device is in the scanning state, listening, by the first communication device, for a third signal for a third period of time, the third signal transmitted by a third communication device in response to the first advertising signal, the third period of time occurring during the second period of time a predefined wait time after the first period of time.

30. A non-transitory computer-readable medium storing computer-executable instructions for establishing a wireless connection, the computer-executable instructions comprising:
    at least one instruction instructing a first communication device to transmit a first advertising signal for a first period of time, the first advertising signal configured to advertise that the first communication device is available to establish a first wireless connection;
    at least one instruction instructing the first communication device to switch, after transmission of the first advertising signal for the first period of time, to a scanning state having a duration of a second period of time following the first period of time, wherein, during the scanning state, the first communication device scans for a second advertising signal transmitted by a second communication device and configured to advertise that the second communication device is available to establish a second wireless connection; and
    at least one instruction instructing the first communication device to listen, while the first communication device is in the scanning state, for a third signal for a third period of time, the third signal transmitted by a third communication device in response to the first advertising signal, the third period of time occurring during the second period of time a predefined wait time after the first period of time.

* * * * *